Nov. 17, 1936. O. C. W. HENZE ET AL 2,061,378
ILLUSION APPARATUS AND METHOD
Filed Nov. 2, 1932
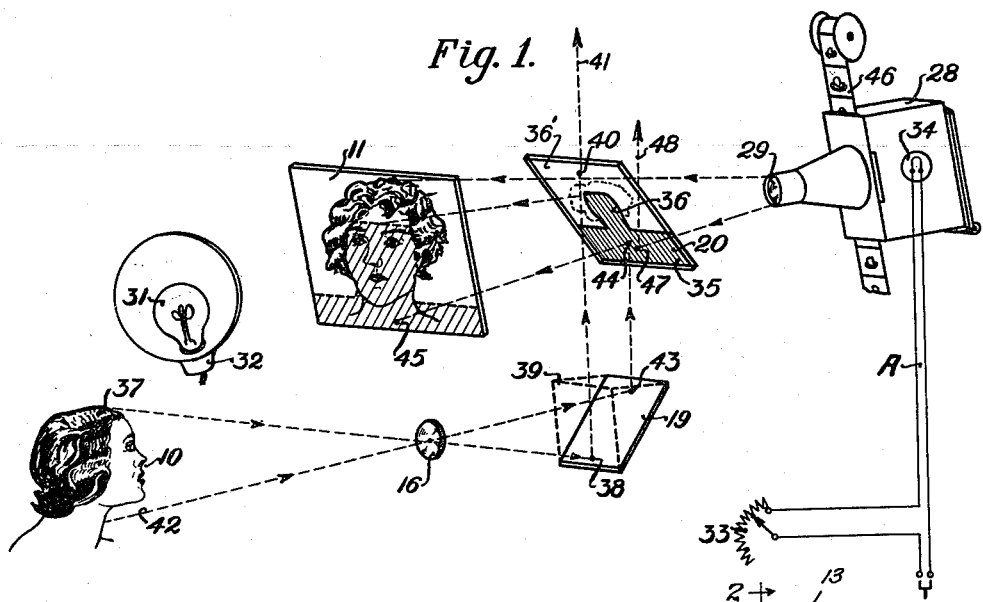
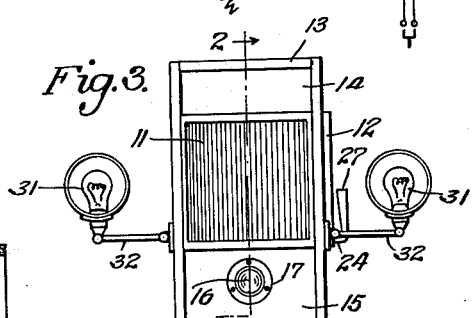
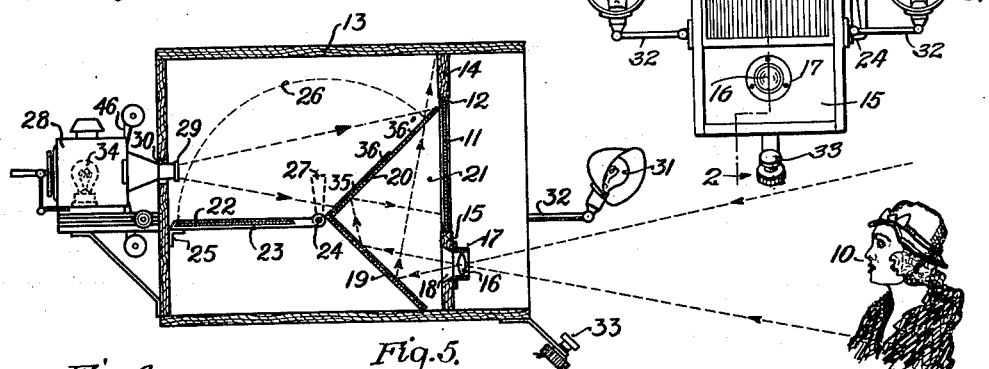
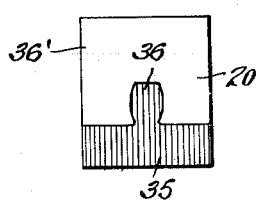
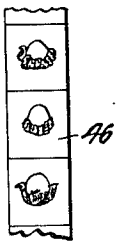
INVENTOR
OTTO C. W. HENZE.
RUTH V. TREMAIN.
BY
ATTORNEYS Patented Nov. 17, 1936

2,061,378

UNITED STATES PATENT OFFICE 2,061,378

ILLUSION APPARATUS AND METHOD

Otto C. W. Henze, Brooklyn, and Ruth V. Tremain, New York, N. Y.; said Tremain assignor to said Henze Application November 2, 1932, Serial No. 640,752

7 Claims. (Cl. 88—24)

This invention relates to improvements in illusion apparatus and method and differs from our copending application, Serial No. 640,750 filed November 2, 1932, in that it embodies the principle of inverted reflex.

The principal feature of the invention resides in an apparatus and method whereby an observer may view his or her own features with adjoining illusions, and more particularly in which displayed hair styles or the like illusory appear to be the observer's own.

Another object of the invention is to provide an illusion device in which the illusion is projected upon a screen to be visible not only by the subject observer, but by other persons within the range of vision of the screen.

A further object of the invention is the provision of an illusion device for use in beauty parlors, department stores, studios, amusement resorts, and the like for revealing certain illusion effects to the subject and surrounding observers.

With these and other objects in view, the invention resides in the certain novel construction, combination and arrangement of parts, the essential features of which are hereinafter fully described, are particularly pointed out in the appended claims, and are illustrated in the accompanying drawing, in which:—

Figure 1 is a diagrammatic view of the invention in use.

Figure 2 is a vertical longitudinal sectional view through the apparatus, taken on line 2—2 of Figure 3.

Figure 3 is a front elevational view.

Figure 4 is a detail front elevational view of the reflex inverter as employ in Figure 2.

Figure 5 is a fragmentary front elevational view of a portion of a hair style display film used in the projector.

Referring to the drawing by reference characters, the numeral 10 designates the head of a person or subject, who in use assumes a position in front of a translucent screen or panel 11 which is mounted in a frame 12 set in an opening in the front wall of an illusion box or housing 13, the opening being defined by the side walls of the box and an upper panel 14 and a lower panel 15. A photographic lens 16 is secured in its mount 17 which in turn is supported upon the front of the panel 15 in alinement with a light passage opening 18 provided therein.

Fixedly mounted within the box or housing 13 behind the translucent screen 11 and disposed at an angle with respect thereto is a reversing mirror 19, the same being within the range of the lens 16. Also mounted within the housing above and in converging relation to the reversing mirror 19 is a reflex mirror 20. This reflex inverter 20 is mounted behind the translucent screen in contact with the top thereof to form a camera obscura 21. The sides of the box 13, reversing mirror 19, and panel 15 coact with the screen to form the said obscura 21.

A first surface mirror 22 is fixedly mounted in a frame 23, which frame is pivotally mounted upon a shaft 24 journaled in opposite side walls of the box 13. The pivotal point of the surface mirror is adjacent the meeting edges of the reflex inverter 20 and reversing mirror 19, and is movable to a position over the reflex inverter 20 as shown by dotted lines in Figure 2 of the drawing. A stop 25 is mounted on the rear wall of the box on which the surface mirror 22 normally rests in a horizontal position. The mirror 22 swings in the arc defined by the dotted lines 26 in Figure 2 of the drawing, while a manipulating handle 27 is fixed to one end of the shaft 24 exteriorly of the box by which the mirror may be swung to the limit of its movement in opposite directions.

Mounted exteriorly at the rear of the box 13 is an adjustable picture-projector 28 which has its projecting lens 29 extending through an opening 30 in the rear wall of the box and disposed in horizontal alinement with the screen 11.

Mounted on the sides of the box at the front thereof are electric lamps 31 supported upon adjustable brackets 32 by which the face of the observer or subject 10 may be illuminated. A rheostat 33 is arranged in an electric circuit A with the electric lamp 34 of the projector 28, and which rheostat is mounted at the front of the box within easy reach of the observer for manually controlling the intensity of the light produced by the lamp 34.

The reflex inverter 20 includes an image pick-up mirror 35 having a mirror extension portion 36 in the center and which extends into a clear transparent field 36'.

In actual practice, the observer assumes a position in front of the box 13 within the range of the lens 16 which picks up and reflects the top of the head or hair 37 of the observer to the point 38 at the bottom of the reversing mirror 19, or if desired, the image is projected onto a prism 39 shown in dotted lines in Figure 1 of the drawing. The reversing mirror reflects the top of the image of the point marked 40 on the reflex inverter 20 in Figure 1 which is in the transparent area 36', thus the reflection of the top of the head or hair 37 is lost and projected in the direction shown by the dotted lines and arrow 41 with respect to the receiving screen 11.

The observer 10 is so positioned that the top of the hair is projected in the manner just described, while the chin 42 will be projected to the point 43 at the top of the reversing mirror or prism from where it is reflected upward to the point 44 of the reflex inverter 20 and within the mirror field 35, and which in turn will reflect the portion of the observer picked up thereby onto the screen 11 at the point marked 45.

The mirror extension 36 of the inverter 20 is so shaped and of such size as to pick up, frame, and reflect upon the screen 11, only the face features of the subject, and filters out the hair and other parts beyond the sides of the face and above the eyebrows. The filtered out portions of the observer or subject being passed through the transparent area 36'.

The projector 28 is adapted to receive film 46 containing pictures of various style hair dress and which film may be substituted by lantern slides or the like to obtain the desired result. The picture displays on the film are projected by the projector 28 through the transparent field 36' of the reflex inverter 20 and onto the screen 11, while the undesired parts 47 of the projected picture are filtered out at 48 by the mirror portions 35 and 36 of the reflex inverter. Thus it will be seen that the reflected facial features of the subject and the projected picture of a particular hair style will merge and a picture will appear on the screen 11 showing such an illusion. The illusion picture is not only visible by the eyes of the subject, but by others gathered in front of the screen who may advise and offer suggestions as to the appearances of the various hair styles when matched with the subject's facial features.

Under certain conditions under which the apparatus is operated, there may result a difference in illumination between the reflected portion of the observer's face and the projected hair style when shown upon the screen 11, but by manipulating the rheostat 33, the light intensity of the lamp 34 may be increased or decreased to bring the projected hair style to the same intensity as the reflected portions of the subject. Thus the tone of the reflected features and the projected display or hair style are matched as to intensity and produce a perfect illusion.

In the event that the observer after taking the proper position before the apparatus and adjusting the light, wishes to compare his or her natural appearance with the illusion picture, the mirror 22 may be manually swung upwardly by the manipulation of the handle 27 so as to overlie the reflex inverter 20 whereby the same provides a mirror surface behind the transparent field 36' of the inverter. Thus all the features and the hair styles of the observer are reflected upon the screen 11 as the said mirror 22 is disposed in the path of the projected picture from the projector 28 and the said mirror acts as a blind to prevent the projected matter from reaching the screen 11. By the actuation of the mirror 22, the observer may alternately compare the illusion style of hair dress with his or her present style.

If desired, the operator of the apparatus may transform the same into one by which a photograph of the illusion may be taken to produce a permanent reproduction of the same. The projector 28 may be used in the same manner as described, but the light from the lamp 34 is normally extinguished, the lens mount 17 is capped and a photographic plate is substituted for the screen 11. For proper exposure, it is only necessary to remove the lens cap while at the same time turning on the electric lamp 34 for the desired time of exposure. The photographic plate after exposure may be developed and photographic prints taken therefrom.

While we have shown and described what we consider to be the most desirable embodiment of our invention, we wish it to be understood that various changes as come within the scope of the appended claims may be resorted to if desired.

Having thus described the invention, what we claim as new and desire to secure by Letters Patent of the United States, is:—

1. The method of producing an illusion portrait of an individual which consists in passing onto a screen in composite merging relation and co-ordinate and contiguous manner desirable features out of a portrait projecting ray beam and other desirable features out of a display projecting ray beam, and simultaneously filtering disturbing features out of both ray beams before striking said screen whereby changes in the individual's appearances are immediately depicted by the individual on said screen.

2. The method of producing an illusion portrait of a person which consists of directly projecting a display upon a screen by means of a ray beam, projecting a portrait ray beam of the person angularly into the path of the display ray beam, filtering out undesirable features of the portrait ray beam at its point of intersection with said display ray beam, and reflecting the remaining features of the portrait ray beam upon the screen in merging relation to the features of the display ray beam to produce a composite portrait for view by the said person stationed forward of the screen.

3. The method of producing an illusion portrait of a person upon a screen which consists in positioning a person in front of a translucent screen and directly projecting a display upon the translucent screen by means of a ray beam, projecting the image of the person by means of a ray beam angularly into the path of the display ray beam, filtering out undesirable features of the person's projected image at the point of intersection of the two ray beams and reflecting the remaining portion of the reflected image upon the screen in merging relation to the projected display ray beam to produce a composite picture for view by the person positioned forward of the translucent screen.

4. In an illusion apparatus, a translucent screen in front of which a subject observer is adapted to be positioned, an image pick up lens for picking up the features of the subject, an image receiving and reversing means behind said lens, a picture projecting device for projecting a display picture upon said screen, and a reflex inverter interposed between said projecting device and said screen and arranged at an angle with respect to said receiving and reversing mirror and in close proximity to said screen and in the path of the light beam from said picture projection device for reflecting a predetermined portion of the reflected image upon said translucent screen for merging with the projected display picture.

5. In an illusion apparatus, a translucent screen in front of which a subject observer is adapted to be positioned, an image pick up lens for picking up the features of the subject, an image receiving and reversing means behind said lens, a picture projecting device for projecting a display picture upon said screen, a reflex inverter interposed between said projecting device and said screen and arranged at an angle with respect to said receiving and reversing mirror and in close proximity to said screen and in the path of the light beam from said picture projection device for reflecting a predetermined portion of the reflected image upon said translucent screen for merging with the projected display picture, and a mirror movable into the path of the projected picture from the projection device and over said receiving and reversing mirror to obscure the same from said screen and cause all of the portions of the subject within range of said lens to be reflected upon said screen.

6. In an illusion apparatus comprising a box-like housing, a translucent screen mounted in the front end thereof and in front of which a subject is adapted to be positioned, a lens in the front wall of said housing below said screen, a reversing mirror mounted at an angle behind said lens, a reflecting mirror arranged at an angle to said reversing mirror and facing said translucent screen and in close proximity thereto, means on said reflecting mirror for reflecting portions of an image from said reversing mirror upon said translucent screen, and a picture projector mounted at the rear of said housing behind said screen and reflecting mirror whereby said reflecting mirror will intercept the projected light beams of said picture projector to permit a restricted portion of the projected picture to pass onto said translucent screen for merger with the reflected image.

7. An illusion apparatus comprising a box-like housing, a translucent screen mounted in the front end thereof and in front of which a subject is adapted to be positioned, a lens in the front wall of said housing below said screen, a reversing mirror mounted at an angle behind said lens, a reflecting mirror arranged at an angle to said reversing mirror and facing said translucent screen and in close proximity thereto, means on said reflecting mirror for reflecting portions of an image from said reversing mirror upon said translucent screen, and a picture projector mounted at the rear of said box-like housing behind said screen and reflecting mirror whereby said reflecting mirror will intercept the projected light beams of said picture projector to permit a restricted portion of the projected picture to pass onto said translucent screen for merger with the reflected image, illuminating means exterior of said box-like housing for the subject, and regulating means associated with said picture projector by which the light intensity of the projected picture may be equalized with that of the reflected image.

OTTO C. W. HENZE.
RUTH V. TREMAIN.